(12) United States Patent
Wong

(10) Patent No.: US 6,615,026 B1
(45) Date of Patent: *Sep. 2, 2003

(54) PORTABLE TELEPHONE WITH DIRECTIONAL TRANSMISSION ANTENNA

(75) Inventor: Alfred Y. Wong, Los Angeles, CA (US)

(73) Assignee: A. W. Technologies, LLC, Beverly Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/241,623

(22) Filed: Feb. 1, 1999

(51) Int. Cl.$^7$ .............................. H04B 1/38; H01Q 1/52
(52) U.S. Cl. ...................... 455/90; 455/550; 343/841; 174/35 R
(58) Field of Search .......................... 455/90, 575, 550, 455/117, 78, 128, 300; 343/770, 702, 841, 873, 834, 829; 342/372; 379/446, 454, 455; 174/35 R

(56) References Cited

U.S. PATENT DOCUMENTS

| | | | |
|---|---|---|---|
| 4,899,164 A | 2/1990 | McGrath | |
| 5,124,889 A | 6/1992 | Humbert et al. | |
| 5,150,282 A | 9/1992 | Tomura et al. | |
| 5,153,600 A | 10/1992 | Metzler et al. | |
| 5,170,173 A | 12/1992 | Krenz et al. | |
| 5,335,366 A | 8/1994 | Daniels | |
| 5,336,896 A * | 8/1994 | Katz ........................ | 250/515.1 |
| 5,367,309 A | 11/1994 | Tashjian | |
| 5,373,304 A | 12/1994 | Nolan et al. | |
| 5,392,461 A | 2/1995 | Yokoyama | |
| 5,444,866 A | 8/1995 | Cykiert | |
| 5,497,168 A * | 3/1996 | Thomas et al. ............ | 343/834 |
| 5,507,012 A | 4/1996 | Luxon et al. ................ | 455/89 |
| 5,525,988 A | 6/1996 | Perkins et al. | |
| 5,530,919 A | 6/1996 | Tsuru et al. | |
| 5,541,609 A | 7/1996 | Stutzman et al. | |
| 5,550,552 A | 8/1996 | Oxley | |
| 5,564,085 A | 10/1996 | Chen et al. | |
| 5,613,221 A | 3/1997 | Hunt | |
| 5,614,915 A * | 3/1997 | Webb .......................... | 343/770 |
| 5,657,386 A | 8/1997 | Schwanke | |
| 5,666,125 A | 9/1997 | Luxon et al. ................ | 343/702 |

(List continued on next page.)

FOREIGN PATENT DOCUMENTS

| | | |
|---|---|---|
| DE | 4221121 | 6/1992 |
| DE | 0741462 | 4/1996 |
| DE | 0883206 | 6/1998 |
| WO | WO94/28595 | 12/1994 |
| WO | WO98/01919 | 1/1998 |
| WO | WO98/29968 | 7/1998 |

OTHER PUBLICATIONS

Yildrim, B.S., et al., Finite–Difference Time–Domain Analysis of a Dual Resonance and Shielded Cellular Antenna, *IEEE Digest*, Aug. 6, 1997, pp. 1751–1754.

Primary Examiner—Charles N. Appiah
(74) Attorney, Agent, or Firm—Irah H. Donner; Hale and Dorr LLP

(57) ABSTRACT

A portable telephone has an antenna structure that directs radiated energy away from the user's head. In one embodiment, the telephone employs an internal transmission antenna, and a metallic surface is interposed between the antenna and the user's head. The metallic surface is spaced apart from the radiating element of the transmission antenna by one-quarter of the effective wavelength, so as to maximize the reflection of energy away from the user's head. The metallic surface is preferably non-planar to disperse the reflected radiation over a wider area than would be the case with a planar surface. In an alternative embodiment, a pair of spaced-apart planar array transmission antennas are used to preferentially steer the radiated power away from the telephone user's head.

21 Claims, 2 Drawing Sheets

U.S. PATENT DOCUMENTS

| | | | |
|---|---|---|---|
| 5,686,928 A * | 11/1997 | Prichett et al. | 343/711 |
| 5,694,137 A * | 12/1997 | Wood | 343/702 |
| 5,726,383 A | 3/1998 | Geller et al. | |
| 5,777,586 A | 7/1998 | Luxon et al. | 343/702 |
| 5,787,340 A | 7/1998 | Sepponen | |
| 5,818,386 A * | 10/1998 | Belisle | 342/372 |
| 5,819,162 A * | 10/1998 | Spann et al. | 455/90 |
| 5,826,201 A | 10/1998 | Gratias | |
| 5,907,307 A * | 5/1999 | Bickert et al. | 343/702 |
| 5,926,748 A * | 7/1999 | Yoshihara et al. | 455/90 |
| 5,945,954 A | 8/1999 | Johnson | 343/702 |
| 5,966,102 A * | 10/1999 | Runyon | 343/820 |
| 5,995,854 A * | 11/1999 | Wilson | 455/575 |
| 5,999,140 A | 12/1999 | Johnson | 343/795 |
| 6,025,812 A * | 2/2000 | Gabriel et al. | 343/797 |
| 6,095,820 A * | 8/2000 | Luxon et al. | 434/702 |
| 6,181,283 B1 | 1/2001 | Johnson et al. | 343/702 |
| 6,191,751 B1 | 2/2001 | Johnson | 343/834 |
| 6,208,300 B1 | 3/2001 | Johnson | 343/702 |
| 6,341,217 B1 * | 1/2002 | Wong | 455/90 |
| 6,515,223 B2 * | 2/2003 | Tashjian | 174/35 R |

* cited by examiner

PORTABLE TELEPHONE WITH DIRECTIONAL TRANSMISSION ANTENNA

BACKGROUND OF THE INVENTION

1. Field of the Invention

The present invention relates generally to the field of portable telephones. More particularly, it relates to a portable telephone with improvements for directing the radiated power away from the telephone user's head.

2. Prior Art

Cellular telephones and cordless telephones (collectively referred to as "portable telephones") are widely used. In recent years, concerns have been expressed about the health effects of long term exposure to the energy radiated by portable telephones. A cellular telephone or cordless telephone uses frequencies in the VHF to microwave range to reach a base station, which then relays communications through a telecommunications network to a destination. Each telephone relies on a transmission antenna that radiates energy outwardly in all directions. Because this antenna is held very close to the user's head, a significant portion of the radiated energy passes through the head on its way to the base station. One estimate places the power absorbed by the head at as high as 50% of the total radiated power. Since an average cellular telephone radiates a power of 600 milliwatts, the extended use of a telephone, for example over 20 minutes, will mean an energy deposit greater than 720 joules into the head. This amount of energy is sufficient to raise the temperature of 17 gm of water by 10 degrees.

In view of the fact that the radiating frequency of a cellular telephone is as high as 1.8 GHz and that of a cordless telephone has reached the high frequency of 2.4 GHz, which is very close to the characteristic frequency of water molecules commonly used in microwave ovens (2.45 GHz), it is important to shield the user from such potentially harmful radiation. Even though precise medical studies on the effect of radiation upon the human brain are not yet complete, prudence compels finding a method of protecting the portable telephone user from unnecessary and potentially harmful radiation. With the anticipated rapidly expanding market for cellular and cordless phones, even higher frequencies will certainly be used to meet the demand for increased bandwidth. The need to protect the telephone users from harmful radiation will be correspondingly greater.

Furthermore, since it is desirable to make portable telephones as light and compact as possible, energy efficiency is an important design consideration. By avoiding the undesirable propagation and absorption of radiation into the user's head, a portable telephone can more efficiently direct radiation into a wide angle away from the user's head.

Various shielding devices have been proposed for portable telephones. For example, such devices are shown in U.S. Pat. Nos. 5,367,309; 5,373,304; 5,444,866; 5,525,988; 5,541,609; 5,507,012; 5,550,552; 5,564,085; 5,613,221; 5,657,386; 5,666,125; 5,694,137; 5,726,383; 5,777,586; 5,787,340; and 5,826,201.

Another approach, and one that is more relevant to the present invention, is disclosed in U.S. Pat. No. 5,530,919. This patent discloses a mobile communicator, such as a cellular telephone, in which the energy radiated by the transmission antenna in the direction of the user's head is attenuated by a ground electrode pattern on an internal circuit board. As disclosed, the transmission antenna comprises a miniature surface-mounted antenna on a circuit board. The opposite side of the circuit board has a ground electrode pattern covering an area that extends beyond the outline of the antenna.

SUMMARY OF THE INVENTION

The present invention provides an improved method of shielding the user of a portable telephone from the energy radiated by the transmission antenna. In one embodiment, the telephone employs an internal transmission antenna, and a metallic surface is interposed between the antenna and the user's head. The metallic surface is spaced apart from the radiating element of the transmission antenna by one-quarter of the effective wavelength, so as to maximize the reflection of energy away from the user's head. The metallic surface is preferably non-planar to disperse the reflected radiation over a wider area than would be the case with a planar surface. In an alternative embodiment, a pair of spaced-apart planar array transmission antennas are used to preferentially steer the radiated power away from the telephone user's head.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
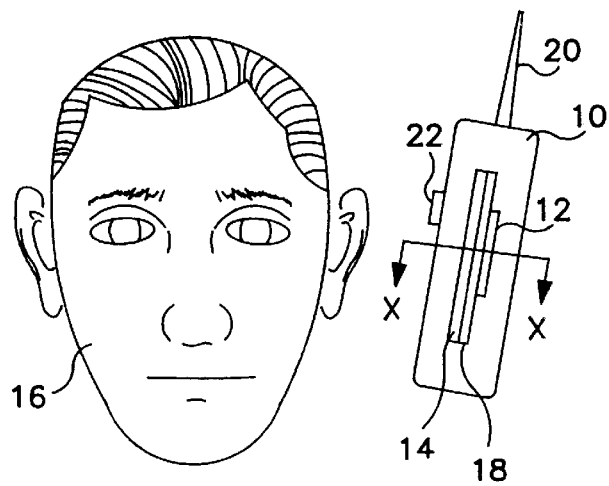
FIG. 1 diagrammatically illustrates a portable telephone 10 constructed in accordance with the present invention.

FIG. 1 illustrates a portable telephone 10 constructed in accordance with the present invention. A transmission antenna 12 is disposed within the body of telephone 10. For purposes of these illustrative examples, antenna 12 is a single dipole; however, the invention is not limited in this regard, and other types of transmission antennas may be utilized. A separate receive antenna 20 may be employed, or antenna 12 may be utilized for both transmission and reception. A metallic surface 14 is interposed between transmission antenna 12 and the telephone user's head 16. Metallic surface 14 reflects energy radiated by antenna 12 away from the user's head.

Telephone 10 preferably includes a radiation monitor 22 on a portion of the telephone body where the shielding effect of metallic surface 14 is maximized. Radiation monitor 22 provides a visual indication that the radiated power at the monitor, and thus at the user's head, is below a level that may adversely affect the health of the user.

Ideally, the spacing between antenna 12 and metallic surface 14 is one-quarter of the electromagnetic wavelength so that reflection of the radiated energy is maximized, thereby maximizing the shielding effect for the user. At the transmission frequencies typically used by portable telephones, a spacing of one-quarter of the wavelength would increase the dimensions of telephone 10 to an unacceptable degree. Therefore, a dielectric material 18 is placed between antenna 12 and metallic surface 14.

A dielectric is a material consisting of electric dipoles which oscillate under the influence of an external electromagnetic wave and reradiate the wave. The net effect is to reduce the wavelength of an electromagnetic wave by the square root of the dielectric constant. For example, for a dielectric constant of 100, the effective wavelength inside the space containing the dielectric is 1/10 of the free space wavelength. As a result, the requirement for a separation of 1/4 the electromagnetic wavelength in the medium can be more easily satisfied. For example, if the transmission frequency of a portable telephone is 1 GHz, 1/4 of the wavelength is 7.5 cm. In an appropriate dielectric, 1/4 of the effective wavelength becomes 0.75 cm, and such a spacing can be easily accommodated in an otherwise conventional portable telephone.

Suitable dielectric materials include a variety of substances, such as ceramics, mica and Mylar. The substance used can be light in weight so that the overall weight of the cellular or cordless telephone does not increase.

Figure 2:
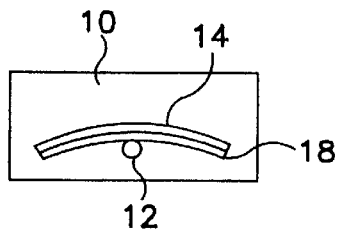
FIG. 2 is a partial cross-sectional view taken through line x—x in FIG. 1 of a first embodiment of the invention.
Figure 3:
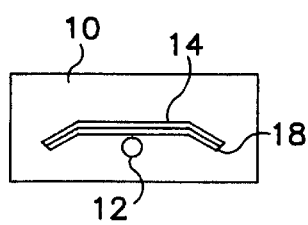
FIG. 3 is a partial cross-sectional view taken through line x—x in FIG. 1 of a second embodiment of the invention.

Metallic surface 14 is preferably non-planar so that the electromagnetic waves radiated by antenna 12 are reflected into a widely scattered area. The non-planar surface causes reflections of radiation from a single dipole into a much wider area than a planar surface and a single dipole. Metallic surface 14 may be curved, as shown in FIG. 2, or may be folded as shown in FIG. 3.

Figure 4:
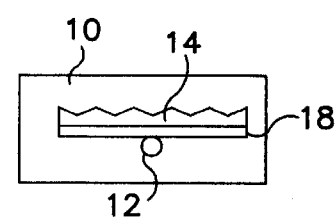
FIG. 4 is a partial cross-sectional view taken through line x—x in FIG. 1 of a third embodiment of the invention.

In a preferred embodiment of the invention, metallic surface 14 is corrugated, as shown in FIG. 4. Such a corrugated surface gives rise to many image dipoles, thereby providing a wide pattern of radiation. The particular shape and size of the corrugations is not critical, the objective being to disperse the reflected radiation as widely as possible. The corrugations are preferably of comparable size or smaller than the spacing to antenna 12.

Figure 5:
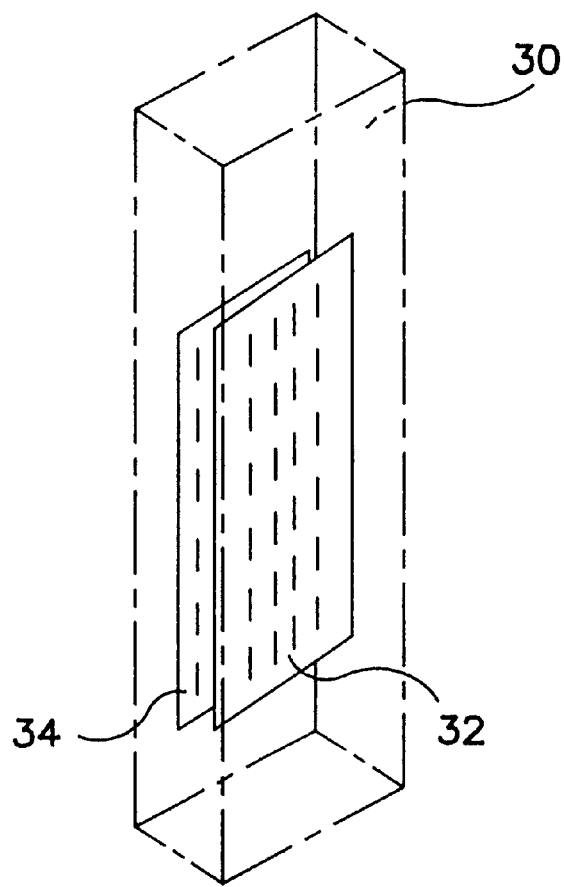
FIG. 5 illustrates a fourth embodiment of the invention employing dual phased array transmission antennas.

As frequencies go higher, the physical dimensions of the antenna become smaller. At high frequencies, it is practical to utilize a phased-array antenna comprising a plurality of radiating elements. The amplitude and phase of each antenna element may be digitally controlled to generate a desired radiation pattern. FIG. 5 illustrates a portable telephone 30 which has dual planar arrays of radiating elements 32 and 34. By using dual arrays spaced apart by approximately 1/2 of the electromagnetic wavelength, the radiation pattern can be controlled to propagate energy in a forward direction, away from the telephone user's head. Such active control of the antenna pattern offers significantly greater protection to the user in comparison to the passive methods previously described. Furthermore, active control of the antenna pattern allows the transmitted energy to be steered towards the cell station of a cellular telephone or base station of a cordless telephone. During reception, the antenna pattern can be scanned to seek the strongest signal. During transmission, power can then be preferentially radiated in the direction of the remote station. Such capability is particularly useful at higher frequencies where the signals are more directional.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A portable telephone comprising:
   a radio frequency transmitter having an operating frequency;
   a radio frequency antenna coupled to the transmitter;
   a non-planar metallic shield spaced apart from the antenna so as to be disposed between the antenna and a user of the portable telephone; and
   a layer of dielectric material disposed in a space between said radio frequency antenna and said non-planar metallic shield;
   wherein a distance between said non-planar metallic shield and said radio frequency antenna is substantially equal to 1/4 of an effective wavelength of a space containing the dielectric material.

2. The portable telephone of claim 1 wherein the non-planar metallic shield is curved.

3. The portable telephone of claim 1 wherein the non-planar metallic shield is folded.

4. The portable telephone of claim 1 wherein the non-planar metallic shield is corrugated.

5. The portable telephone of claim 1 wherein the antenna comprises a dipole.

6. The portable telephone of claim 1 further comprising a radiation monitor.

7. The portable telephone of claim 1 wherein the antenna comprises a dipole.

8. The portable telephone of claim 1 wherein the antenna comprises a cross dipole.

9. The portable telephone of claim 1 wherein the antenna comprises a patch antenna.

10. The portable telephone of claim 1 wherein the antenna comprises a cross patch antenna.

11. A portable telephone comprising:
    a radio frequency transmitter having an operating frequency;
    a radio frequency antenna coupled to the transmitter;
    a layer of dielectric material disposed on at least a portion of said radio frequency antenna; and
    a metallic shield disposed on said layer of dielectric material so as to be positioned between the antenna and a user of the portable telephone;
    wherein the metallic shield is spaced apart from the antenna by a distance approximately equal to 1/4 of an effective wavelength in the dielectric material of said operating frequency.

12. The portable telephone of claim 11 wherein the metallic shield is non-planar.

13. The portable telephone of claim 11 wherein the antenna comprises a dipole.

14. The portable telephone of claim 11 further comprising a radiation monitor.

15. A portable telephone comprising:
    a radio frequency transmitter having an operating frequency;
    a radio frequency antenna coupled to said radio frequency transmitter;
    a layer of dielectric material disposed on at least a portion of said radio frequency antenna;
    said layer of dielectric material having a prescribed dielectric constant; and a metallic shield disposed on said layer of dielectric material and positioned between said radio frequency antenna and a user of the portable telephone;

wherein a distance between said metallic shield and said radio frequency antenna is a predetermined fraction of an effective wavelength of a space containing the dielectric material.

16. The portable telephone of claim 15, wherein said dielectric constant is selected such that said predetermined fraction is ¼ of said effective wavelength.

17. The portable telephone of claim 15, wherein said dielectric constant is 100.

18. The portable telephone of claim 15, wherein said dielectric constant is greater than 100.

19. The portable telephone of claim 15, wherein the distance between said metallic shield and said radio frequency antenna is 0.75 cm or less.

20. The portable telephone of claim 15, wherein the dielectric constant is 50.

21. The portable telephone of claim 15, wherein the dielectric constant is greater than 50.

* * * * *